Patented May 10, 1932

1,857,632

UNITED STATES PATENT OFFICE

CHARLES W. GIRVIN, OF LONG BEACH, CALIFORNIA, ASSIGNOR OF FORTY PER CENT TO LEVERING LAWRASON, OF LOS ANGELES, CALIFORNIA

METHOD OF PURIFYING AND DRYING CRUDE IODINE

No Drawing. Application filed November 19, 1930. Serial No. 496,823.

This invention is a method of purifying and drying crude iodine; and has for its object to not only free the iodine of non-volatile foreign matter such as may be separated by the usual method of sublimation, but also remove such volatile impurities as when employing the usual method of sublimation are liable to evaporate and pass over into the condenser along with the iodine so that it is extremely difficult to recover only the pure product.

More particularly it is the object of the invention to prevent free evaporation of the crude iodine in the presence of heat, and thus melt it without sublimation, so that foreign matter and impurities rise to the surface of the fused iodine as a result of its relatively high specific gravity, thereby permitting ready separation and recovery of the pure iodine.

It is a still further object of the invention to prevent free evaporation of the crude iodine by covering it with a medium which is adapted to dissolve or destroy active impurities rising to the surface of the fused mass, with inert foreign matter collecting upon the surface of the fused iodine beneath the covering medium, so that by subsequently removing the covering medium and scraping-off any coating of inert foreign matter the iodine is left in practically pure form.

It is a still further object of the invention to employ as the covering medium a liquid acid in which, from a practical standpoint, iodine is insoluble, and which has a boiling point appreciably higher than the melting point of iodine, so that when heat is applied the liquid acid maintains a covering for preventing evaporation of the iodine and thus insures its melting to a fused mass, and the acid which is employed being such as will have no chemical action on the iodine, but which will dissolve or destroy foreign matter rising to the surface of the fused mass, except such inert foreign matter as will simply collect on the surface of the fused mass beneath the blanketing medium, so that by subsequently pouring-off the acid covering, the coating of any remaining impurities may be readily scraped-off.

Further objects of the invention will be readily understood from the following description of one practical and preferred embodiment of the improved process.

Iodine as recovered in crude form, and particularly iodine recovered from waste oil field waters, generally contains more or less foreign matter and particularly organic impurities, which by the usual method of sublimation are extremely difficult to separate from the crude iodine since such impurities are liable to evaporate and pass over into the condenser along with the sublimed iodine.

The present invention provides for melting the crude iodine without sublimation, by covering the crude product so as to prevent free evaporation and then applying heat, thereby collecting impurities at the surface of the fused mass as a result of the relatively high specific gravity of the fused iodine. The covering medium which is employed is preferably adapted to dissolve or destroy the collected impurities without chemically reacting with the iodine, and is characterized by a boiling point higher than the melting point of the iodine so as to maintain the covering and thus prevent evaporation of the iodine in order that its temperature may be raised to the melting point.

As an instance of such covering medium I may employ sulfuric acid, the boiling point of which is so much higher than the melting point of iodine, that upon application of heat the acid will maintain a liquid covering over the iodine and by thus preventing its evaporation will cause its temperature to rise to the melting point so that the iodine is reduced to a fused mass. The sulfuric acid such as described has no chemical action on the iodine, and from a practical standpoint iodine is substantially insoluble in sulfuric acid, but the sulfuric acid will dissolve or destroy practically all the organic matter and other impurities which will rise to the top of the melted iodine as a result of its high specific gravity, and any remaining inert impurities which rise to the top of the fused mass will simply collect as a coating beneath the acid, permitting such coating to be readily scraped-off after removal of the acid.

In practical working of the process I have recovered crude iodine in any usual manner from oil field waste water, as for example by converting the soluble iodines of the brine to sodium iodide, hydriodic acid, or ferrous iodide, depending upon the particular process which is employed, and the iodine has then been precipitated by the use of a suitable oxidizing agent such as chlorine, nitrous acid, sodium bichromate, or the like, and the precipitated iodine then filtered out and washed with water to remove any water soluble impurities. The resulting crude iodine may contain as much as from 10 to 20 per cent water, and also contains more or less water insoluble impurities which have not been removed by the washing, as for example impurities in the form of both volatile and inert organic matter, particularly when the iodine has been recovered from oil field waste water.

To remove practically all such impurities the crude moist iodine is placed in a suitable container which is proof against both acid and iodine, a container of usual enamel ware having been successfully employed, and the iodine is then covered to a depth of substantially an inch or more with concentrated sulfuric acid, in which iodine is so very slightly theoretically soluble that for practical commercial purposes the iodine may be considered insoluble, and which in its concentrated form will readily take-up water from the moist iodine, with no possibility of the sulfuric acid boiling out of the water solution.

The usual commercial concentrated acid of 66 Bé. may be employed, or concentrated acid of greater strength up to 100%, and also acid of greater concentration than 100%, and known as fuming acid and which would be immediately reduced to below 100% by the moisture of the crude iodine, may be successfully employed, and it will thus be understood that acid of any concentration as aforementioned is indicated in the term "concentrated".

Heat is then applied, and since the covering of acid prevents free evaporation of the iodine there is no such absorption of heat by evaporation as will prevent the temperature rising to the melting point and fusing the iodine; and to prevent loss by evaporation when the heat is first applied and before the temperature has been raised to the melting point, any escaping iodine vapors are preferably condensed and recovered, as for example by mounting a suitable water jacket on the container so as to overlie the acid. A comparatively slow heat is preferably employed and the temperature of the iodine is gradually raised to slightly above its melting point of 114 deg. C., the period of heating necessary to obtain the desired temperature, of course, depending upon the intensity of the heat and the capacity of the container.

In actual practice, employing a container such as an ordinary hand bucket, and with a comparatively gentle flame, the iodine has been completely melted in approximately a half hour.

After the iodine has been reduced to a fused mass, it is preferably gradually cooled to ordinary room temperature, as for example by jacketing the entire container with cold water; and the fused iodine is then substantially free of all impurities, since the relatively high specific gravity of the fused iodine will have caused all foreign matter, and particularly the organic impurities of oil field waste water, to rise to the top of the fused mass where the active impurities are dissolved or destroyed by the acid, and the inert impurities form a coating on the fused iodine beneath the acid.

The acid is then poured off, carrying with it moisture and impurities from the fused iodine, and the cake of fused iodine is then removed from the container and washed free of any remaining acid, after which any inert impurities which have formed a coating on the cake may be readily scraped-off, leaving practically pure iodine which may then be readily dried of any remaining moisture.

The invention thus provides a great saving in time and apparatus over the prior method of purifying by sublimation, and also appreciably reduces loss by evaporation, with the covering of sulfuric acid, in which for practical purposes iodine is insoluble, preventing escape of iodine vapors so that when heat is applied the temperature may be raised to the melting point for fusing the iodine, and the fused iodine readily separating from impurities as a result of the relatively high specific gravity of the fused iodine, and the impurities being either held by the acid and washed off therewith, or forming a coating on the cake of fused iodine which may be conveniently removed by scraping.

The use of sulfuric acid as herein described has proved particularly advantageous, in that concentrated sulfuric acid is relatively inexpensive and has a boiling point and specific gravity whereby it is adapted to maintain a heavy covering over the iodine for preventing escape of iodine vapors and thus insuring a melting temperature being readily obtained; and concentrated sulfuric acid although having no chemical action on iodine, is particularly adapted for destruction and dissolution of organic impurities, and is capable of holding water even at a relative high temperature.

I claim:

1. The method of purifying iodine comprising enclosing the iodine against free evaporation and heating the iodine to above its melting point for reducing it to a fused mass so that impurities rise to its surface as a result of the relatively high specific gravity of fused iodine, the iodine being enclosed against free evaporation by sulfuric acid which is adapted for reaction with impurities rising from the fused iodine, and withdrawing the acid so as to free the iodine of said impurities.

2. The method of purifying iodine comprising enclosing the iodine against free evaporation and heating the iodine to above its melting point for reducing it to a fused mass so that impurities rise to its surface as a result of the relatively high specific gravity of fused iodine, the iodine being enclosed against free evaporation by sulfuric acid which is adapted for reaction with active impurities rising to the surface of the fused iodine, withdrawing the acid so as to free the iodine of said active impurities, and removing from the surface of the fused iodine any remaining coating of inert impurities.

3. The method of purifying and drying crude iodine comprising placing the crude iodine in an acid and iodine proof container and covering the crude iodine with concentrated sulfuric acid, heating the iodine to slightly above its melting point so as to reduce the iodine to a fused mass, cooling the fused iodine to ordinary room temperature, removing the sulfuric acid, washing the fused iodine, and scraping from its surface any remaining coating of impurities.

4. The method of drying moist crude iodine comprising enclosing the iodine against free evaporation and heating the iodine to above its melting point for reducing it to a fused mass so that moisture rises to its surface, the iodine being enclosed against free evaporation by concentrated sulfuric acid which is adapted to take-up moisture from the fused iodine, and withdrawing the acid so as to free the iodine of said moisture.

5. The method of purifying and drying moist crude iodine comprising enclosing the iodine against free evaporation and heating the iodine to above its melting point for reducing it to a fused mass so that impurities and moisture rise to its surface as a result of the relatively high specific gravity of fused iodine, the iodine being enclosed against free evaporation by concentrated sulfuric acid which is adapted to take-up moisture from the fused iodine and which is adapted for reaction with active impurities rising to the surface of the fused iodine, withdrawing the acid so as to free the iodine of said moisture and active impurities, and removing from the surface of the fused iodine any remaining coating of inert impurities.

6. The method of purifying iodine comprising enclosing the iodine against free evaporation and heating the iodine to above its melting point for reducing it to a fused mass so that impurities rise to its surface as a result of the relatively high specific gravity of fused iodine, the iodine being enclosed against free evaporation by sulfuric acid, and withdrawing the acid and impurities from the surface of the fused iodine.

7. The method of purifying iodine comprising enclosing the iodine against free evaporation and heating the iodine to above its melting point for reducing it to a fused mass so that impurities rise to its surface as a result of the relatively high specific gravity of fused iodine, the iodine being enclosed against free evaporation by sulfuric acid, cooling the fused iodine, and withdrawing the acid and impurities from the surface of the fused iodine.

8. The method of purifying iodine comprising enclosing the iodine against free evaporation and heating the iodine to above its melting point for reducing it to a fused mass so that impurities rise to its surface as a result of the relatively high specific gravity of fused iodine, the iodine being enclosed against free evaporation by sulfuric acid, condensing any evaporation of the iodine, and withdrawing the acid and impurities from the surface of the fused iodine.

9. The method of purifying iodine comprising enclosing the iodine against free evaporation and heating the iodine to above its melting point for reducing it to a fused mass so that impurities rise to its surface as a result of the relatively high specific gravity of fused iodine, the iodine being enclosed against free evaporation by sulfuric acid, condensing any evaporation of the iodine escaping through the acid and recovering the condensate, and withdrawing the acid and impurities from the surface of the fused iodine.

In testimony whereof I have affixed my signature.

CHARLES W. GIRVIN.